United States Patent
Wolfner et al.

(10) Patent No.: US 12,069,529 B2
(45) Date of Patent: Aug. 20, 2024

(54) METHOD AND APPARATUS FOR PROVIDING NETWORK TRIGGERED MOBILITY BETWEEN A STAND-ALONE NON-PUBLIC NETWORK AND A PUBLIC LAND MOBILE NETWORK

(71) Applicant: Nokia Technologies Oy, Espoo (FI)

(72) Inventors: Gyorgy Wolfner, Budapest (HU); Devaki Chandramouli, Plano, TX (US); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 430 days.

(21) Appl. No.: 17/618,407

(22) PCT Filed: Jun. 14, 2019

(86) PCT No.: PCT/US2019/037291
§ 371 (c)(1),
(2) Date: Dec. 10, 2021

(87) PCT Pub. No.: WO2020/251588
PCT Pub. Date: Dec. 17, 2020

(65) Prior Publication Data
US 2022/0240147 A1   Jul. 28, 2022

(51) Int. Cl.
*H04W 36/18* (2009.01)
*H04W 36/14* (2009.01)
*H04W 36/30* (2009.01)

(52) U.S. Cl.
CPC .......... *H04W 36/18* (2013.01); *H04W 36/14* (2013.01); *H04W 36/30* (2013.01)

(58) Field of Classification Search
CPC ..... H04W 48/18; H04W 36/14; H04W 36/18; H04W 36/30; H04W 84/042
See application file for complete search history.

(56) References Cited

U.S. PATENT DOCUMENTS

2006/0019664 A1* 1/2006 Nelakanti ............. H04W 36/14
                                                        455/436
2015/0055447 A1 2/2015 Jamadagni et al.
(Continued)

FOREIGN PATENT DOCUMENTS

WO   2010/120311 A1   10/2010

OTHER PUBLICATIONS

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

(Continued)

*Primary Examiner* — Allahyar Kasraian
(74) *Attorney, Agent, or Firm* — Barta Jones, PLLC

(57) ABSTRACT

A method, apparatus and computer program product are provided herein to provide service continuity between a Stand-alone Non-Public Network (SNPN) and a Public Land Mobile Network (PLMN). For example, a method is provided that comprises after determining that the user equipment (UE) with the first protocol data unit (PDU) session established in the first SNPN is or will be leaving the coverage area of the first SNPN, causing a request message to be transmitted to the UE, wherein the request message comprises a request to initiate a second PDU session establishment procedure towards a PLMN. The method also includes causing the UE to establish the second PDU session with an internet protocol anchor function of a user plane function in the PLMN via the first SNPN radio access network (RAN) or via the PLMN RAN, wherein the second PDU session is established prior to release of the first PDU session.

20 Claims, 7 Drawing Sheets

(56) References Cited

U.S. PATENT DOCUMENTS

| | | | |
|---|---|---|---|
| 2016/0037393 A1 | 2/2016 | Suh et al. | |
| 2019/0007500 A1 | 1/2019 | Kim et al. | |
| 2020/0389835 A1* | 12/2020 | Talebi Fard | H04W 28/0289 |
| 2022/0038889 A1* | 2/2022 | Liu | H04W 48/18 |
| 2022/0201482 A1* | 6/2022 | Ferdi | H04L 9/0891 |
| 2022/0201592 A1* | 6/2022 | Lindheimer | H04W 48/10 |

OTHER PUBLICATIONS

"3rd Generation Partnership Project; Technical Specification Group Services and System Aspects; Study on enhancement of 5G System (5GS) for vertical and Local Area Network (LAN) services (Release 16)", 3GPP TR 23.734, V16.1.0, Mar. 2019, pp. 1-111.

"5G Non-public Networks for Industrial Scenarios", 5G Alliance for Connected Industries and Automation, Mar. 2019, 20 pages.

"3rd Generation Partnership Project; Technical Specification Group Services and System Aspects; Study on security for 5GS enhanced support of Vertical and LAN Services; (Release 16)", 3GPP TR 33.819, V0.3.0 , Mar. 2019, pp. 1-25.

"3rd Generation Partnership Project; Technical Specification Group Core Network and Terminals; Technical realization of Cell Broadcast Service (CBS) (Release 16)", 3GPP TS 23.041, V16.0.0, Mar. 2019, pp. 1-98.

International Search Report and Written Opinion received for corresponding Patent Cooperation Treaty Application No. PCT/US2019/037291, dated Oct. 7, 2019, 22 pages.

"Handover procedure between PLMN and SNPN", 3GPP TSG-SA WG2 Meeting #133, S2-190xxxx, Huawei, May 13-17, 2019, 2 pages.

"3rd Generation Partnership Project; Technical Specification Group Services and System Aspects; Procedures for the 5G System; Stage 2 (Release 16)", 3GPP TS 23.502, V16.1.1, Jun. 2019, pp. 1-495.

"Discussion of service continuity between PLMN and SNPN for single radio UE", 3GPP TSG-SA WG2 Meeting #132, 62-1903727, Agenda: 6.15.3, Huawei, Apr. 8-12, 2019, 4 pages.

"3rd Generation Partnership Project; Technical Specification Group Services and System Aspects; Study on enhancement of 5G System (5GS) for vertical and Local Area Network (LAN) services (Release 16)", 3GPP TR 23.734, V16.2.0 , Jun. 2019, pp. 1-117.

Office Action received for corresponding European Patent Application No. 19735685.0, dated Mar. 7, 2024, 6 pages.

\* cited by examiner

METHOD AND APPARATUS FOR PROVIDING NETWORK TRIGGERED MOBILITY BETWEEN A STAND-ALONE NON-PUBLIC NETWORK AND A PUBLIC LAND MOBILE NETWORK

RELATED APPLICATION

This application was originally filed as PCT Application No. PCT/US2019/037291, filed on Jun. 14, 2019, of which is incorporated herein by reference in its entirety.

TECHNICAL FIELD

An example embodiment of the present disclosure relates to improvements in maintaining service continuity between different access networks. In particular, it relates to arrangements providing improvements in terms of service continuity between a Stand-alone Non-Public Network (SNPN) and a Public Land Mobile Network (PLMN).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The fifth generation of mobile networks (5G networks) is expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements in terms of performance, 5G networks are also expected to extend the flexibility in the network usage and to allow providing users with a wider range of use cases and business models.

In current systems, a roaming user mobile device has to select a new network operator in the visited country among a plurality of local network operators.

This local network selection is based on a static ordered list of preferred operators. Furthermore, this list is predetermined and based on previously established Service Level Agreement (SLA) between the home network operator of the user and the local network operators in the visited country (e.g. Roaming contract).

However, this solution does not take into account Stand-alone Non-Public Network (SNPN) (e.g., a non-public network not relying on network functions provided by a PLMN), it is assumed that there is no SLA between SNPN and Public land mobile network (PLMN), as specified in release 16 of 3GPP technical standards. Thus, there is no control plane nor user plane tunnel assumed between SNPN and Public PLMN.

Conventional approaches require access to PLMN services via SNPN RAN, access to SNPN services via PLMN RAN, and PDU session mobility from SNPN RAN to PLMN RAN. According to release 16, to access SNPN services, a UE that has successfully registered with a PLMN may perform another registration via the PLMN with an SNPN (using the credentials of that SNPN). To access PLMN services, a UE in SNPN access mode that has successfully registered with an SNPN may perform another registration via the SNPN with a PLMN (using the credentials of that PLMN). Certain embodiments of this disclosure do not assume agreement between SNPN and PLMN operators.

Thus, modifications may be made by providing the PLMN operator to bridge the two SNPNs in which no agreement is needed between SNPN and PLMN operators, no control/user plane interface assumed, nor common UPF assumed when the UE moves from the coverage area of an SNPN to another SNPN via a PLMN, e.g., when the SNPNs do not provide a wide area coverage. Thus, certain embodiments may work with the UE not supporting dual radio allowing for a simple device design while still allowing the UE to support non-SIM based credential and SNPN to support any authentication mechanism, which is not the case with conventional approaches.

In order to prevent user equipment (UE) from suffering service interruption due to network changes, certain embodiments of the present invention provide interworking mechanisms to maintain service continuity.

SUMMARY

To address these needs, a first aspect of an example embodiment of the present disclosure relates to methods, apparatuses, and computer program products be configured to determine whether a user equipment with a first protocol data unit session established in a first stand-alone non-public network is or will be leaving the coverage area of the first stand-alone non-public network. The methods, apparatuses, and computer program product also include after determining that the user equipment with the first protocol data unit session established in the first stand-alone non-public network is or will be leaving the coverage area of the first stand-alone non-public network, causing a request message to be transmitted to the user equipment, wherein the request message comprises a request to initiate a second protocol data unit session establishment procedure towards a public land mobile network and causing the user equipment to establish the second protocol data unit session with an internet protocol anchor function of a user plane function in the public land mobile network via the first stand-alone non-public network radio access network or via the public land mobile network radio access network, wherein the second protocol data unit session is established prior to release of the first protocol data unit session.

In another example embodiment, methods, apparatuses, and computer program product are configured to determine whether a user equipment with a first protocol data unit session established in a public land mobile network is or will be leaving the coverage area of the public land mobile network. The methods, apparatuses, and computer program product also include causing a request message to be transmitted to the user equipment, wherein the request message comprises a request to initiate a second protocol data unit session establishment procedure towards a stand-alone non-public network and causing the user equipment to establish the second protocol data unit session using a network identifier associated with the second stand-alone non-public network and causing the user equipment to establish the second protocol data unit session with an internet protocol anchor function of a user plane function in the second stand-alone non-public network via the public land mobile network radio access network or via the stand-alone non-public network radio access network, wherein the second protocol data unit session is established prior to release of the first protocol data unit session.

In yet another example embodiment, methods, apparatuses, and computer program products are configured to compare a first cell identifier of a first cell of the first stand-alone non-public network with guidance information or comparing a first tracking area code of the first cell of the stand-alone non-public network with the guidance information, wherein the guidance information identifies cells that are at an edge of the first stand-alone non-public network, initiate a second protocol data unit session establishment procedure towards a public land mobile network in an instance in which the result of the comparison shows that the first cell identifier or the first tracking area code matches the cells that are at the edge of the first stand-alone non-public network, and establish the second protocol data unit session with an internet protocol anchor function of a user plane function in the public land mobile network via the first stand-alone non-public network radio access network or via the public land mobile network radio access network.

In another example embodiment, methods, apparatuses, and computer program products are configured to receive at a user equipment a request to initiate a second protocol data unit session establishment procedure with a second network, wherein the user equipment has an established first protocol data unit session with a first network and in response to the request, establish by the user equipment the second protocol data unit session with the second network, wherein the second protocol data unit session with the second network is established prior to release of the first protocol data unit session with the first network. In an example embodiment, the first network and the second network is a stand-alone non-public and a public land mobile network respectively, or the first network and the second network is the public land mobile network and the stand-alone non-public network respectively.

BRIEF DESCRIPTION OF THE DRAWINGS

Certain embodiments of the present disclosure are illustrated by way of example, and not by way of limitation, in the figures of the accompanying drawings, in which like reference numerals refer to similar elements and in which.

DESCRIPTION OF EXAMPLE EMBODIMENTS

Figure 1:
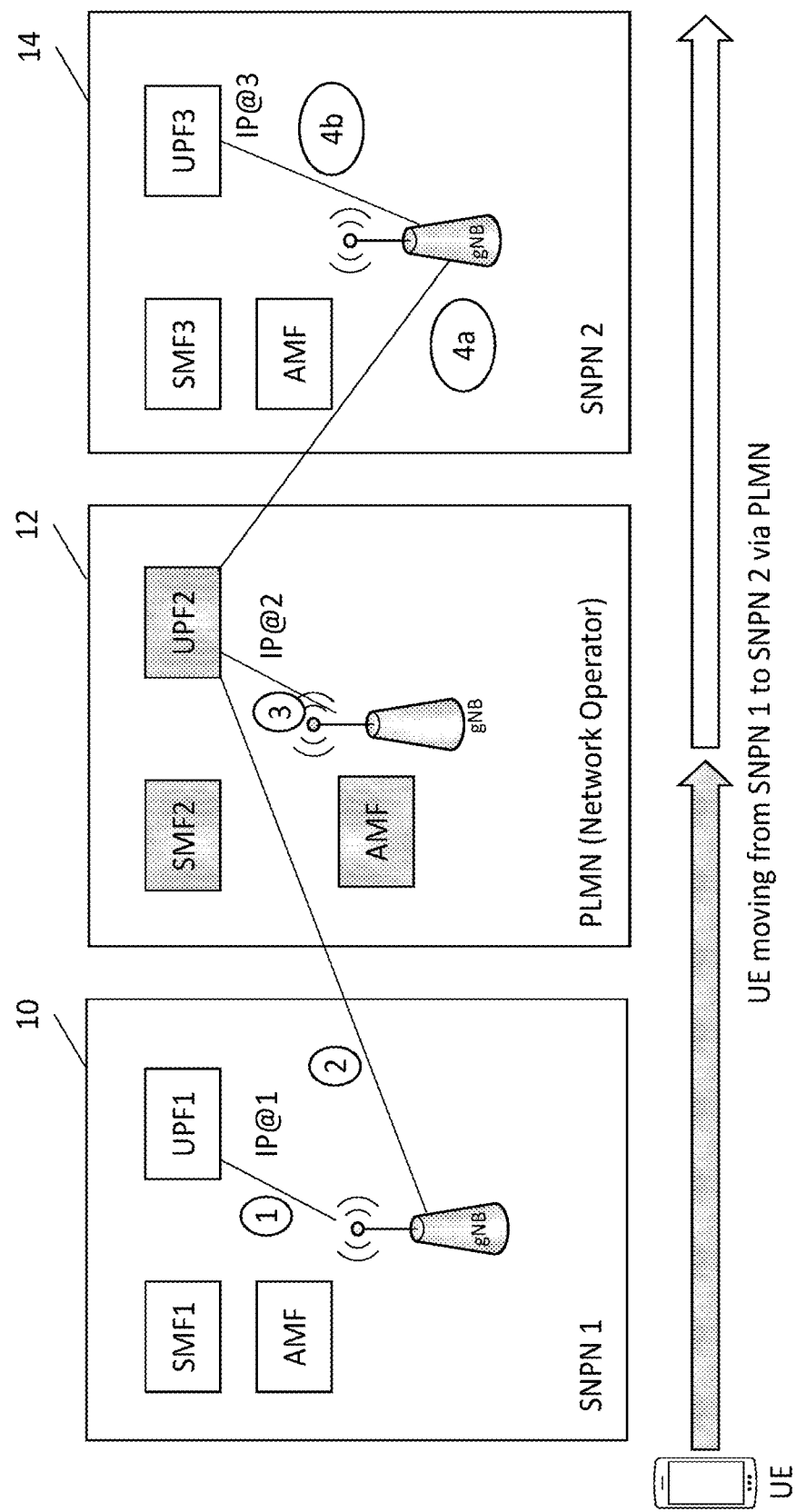
FIG. 1 depicts a system that may benefit from the procedures discussed and contemplated herein in accordance with an example embodiment of the present disclosure.

One of the problems to solve for the next generation fifth generation (5G) networks is how to provide service continuity between SNPN and PLMN. A method, apparatus and computer program product of an example embodiment address this issue by providing for service continuity between an SNPN and a PLMN.

Some embodiments will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, which illustrates an example system that supports communications between a UE and one or more access points, each access point may communicate with one or more stations. The access points may, in turn, communicate with one or more networks. While the access points may communicate via an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11 ah or 802.1 lac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like. [00122] The access points and the UE may communicate via wireline communications, but most commonly communicate via wireless communications. For example, the access points and the UE may communicate in a sub 1 GHz band as defined by IEEE 802.11 ah standard or in a 5 GHz band, which may be defined by, for example, IEEE 802.1 lac standard. The access point may be embodied by any of a variety of network entities, such as an access point, a base station, a Node B, a gNodeB (gNB), a radio network controller (RNC), a mobile device/a station (e.g., mobile telephones, smart phones, portable digital assistants (PDAs), pagers, laptop computers, tablet computers or any of numerous other hand held or portable communication devices, computation devices, content generation devices, content consumption devices, or combinations thereof), or the like. The UE may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the UE may be embodied by mobile terminals, such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the UE is embodied by a mobile terminal, the communication between an access point and the UE may serve to extend the range of wi-fi or another wireless local area network (WLAN), such as by extending the range of a hotspot, and to offload traffic that otherwise would be carried by a cellular or other network.

Figure 2:
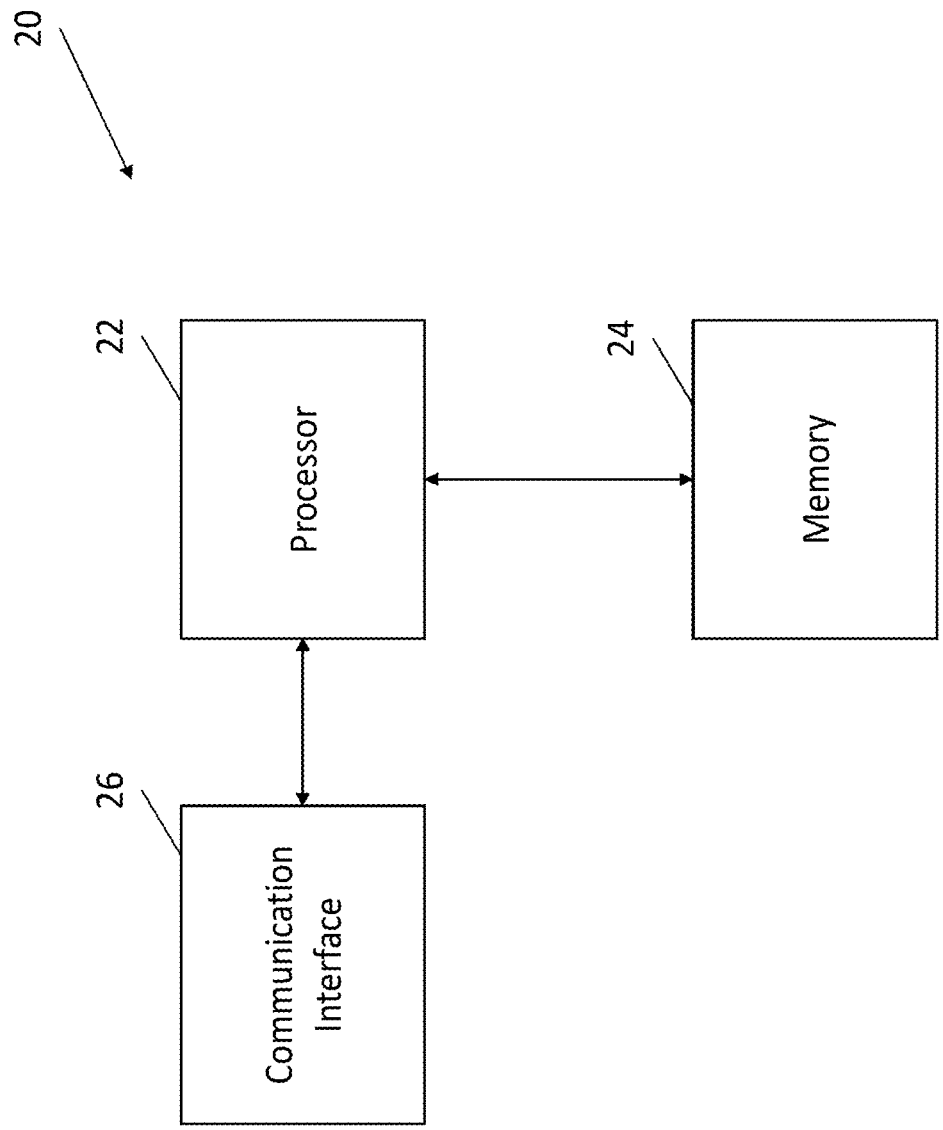
FIG. 2 is a block diagram of an apparatus configured in accordance with an example embodiment in order to control access to a hosted virtual network.

The access point and/or the UE or any of the network devices including, but not limited to SMF, AMF, UPF, or any of the network or other devices shown or described, may be embodied as or otherwise include an apparatus 20 that is specifically configured to perform the functions of the respective device, as generically represented by the block diagram of FIG. 2. While the apparatus may be employed, for example, by an access point or a UE, it should be noted that the components, devices or elements described below may not be mandatory and thus some may be omitted in certain embodiments. Additionally, some embodiments may include further or different components, devices or elements beyond those shown and described herein.

Disclosed is a method to provide full service continuity while not making any assumptions regarding the agreement between SNPN and PLMN networks.

An example embodiment provides for signalling instructions to the UE to establish a second PDU Session in the PLMN prior to releasing the first PDU Session established in the SNPN in order to ensure service continuity.

FIG. 1 shows a possible solution that could be adopted in a 5G setting in an example embodiment. FIG. 1 shows a user equipment (UE) moving from SNPN1 to SNPN 2, wherein the movement is indicated by the arrow. The UE has an established first PDU session with SNPN1 for a certain Data Network Name (DNN), Network Slice Selection Assistance Information (NSSAI). During operation, when a UE moves to a position from close to gNB of SNPN1 to close to gNB of PLMN, e.g. changes cells, the first PDU (packet data unit) session using the first communication path 1, which is anchored to UPF1, is maintained as depicted at 1 of FIG. 1, and a new PDU session is established using a second communication path as shown at 2 of FIG. 1, which is anchored to UPF2 and which uses a different IP address IP@2. This type of service continuity is of the general type referred to as a 'make-before-break', since the original PDU session is terminated after the new PDU session is established. As a result, service discontinuity in the time interval between tearing down the original session and setting up the new session is ensured.

Once the UE moves to PLMN RAN, the second PDU session is supported from SNPN RAN to PLMN RAN as depicted at 3 of FIG. 1. In another example embodiment, to prevent unauthorized UEs from trying to access a public network integrated SNPN, the Closed Access Group (CAG) functionality is provided. In this case, the UE is assumed to access the restricted CAG cells and register to the PLMN RAN.

In another example embodiment, the first PDU session may be released/terminated upon expiration of an inactivity timer.

At 4a and 4b, FIG. 1 shows the UE moves to a position from close to gNB of PLMN to close to gNB of SNPN2, e.g. changes cells, the second PDU (packet data unit) session using the a communication path anchored to UPF2, is maintained as depicted at 4a of FIG. 1, and a new PDU session is established using a third communication path as shown at 4b of FIG. 1, which is anchored to UPF3 and thus uses a different IP address IP@3.

In an example embodiment, when the UE moves away and is about to lose PLMN coverage e.g. moving beyond the PLMN UPF2 serving area, the PLMN network signals the UE to establish a third PDU session via SNPN identified by a certain network identifier (NID). In the case where the network signals the UE to establish the new PDU session (e.g., UE receives a request to initiate a PDU session establishment procedure comprising a certain NID), the UE establishes the third PDU session with anchor point in the SNPN UPF3 via PLMN RAN, thereafter the UE moves from PLMN RAN to SNPN RAN. Additionally or alternatively, the UE moves from PLMN RAN to SNPN RAN with anchor point remaining in the PLMN UPF2 in the instance the network does not signal the UE to establish a PDU session. For example, the UE will still have its former PDU session established in the PLMN.

In an example embodiment, if the network has signalled the UE to establish a PDU session, then the UE establishes a PDU session with anchor point in the SNPN UPF via SNPN RAN. If the network has not signalled the UE to establish a PDU session, then the UE will still have the PDU session with anchor point in the PLMN UPF.

As illustrated in FIG. 1, the first PDU session spans from the UE via gNB of SNPN1 to UPF1, while the second PDU session spans from the UE via gNB of PLMN to UPF2. Based on these two PDU sessions, two paths are set up, which may span even beyond the 3GPP network. Additionally, in another example embodiment, a third PDU session spans from the UE via gNB of SNPN2 to UPF3. In this example embodiment, multiple PDU sessions are set up from the UE, which use independent RAN (gNB) and core network (CN) (such as UPF) entities.

Referring to FIG. 2, the apparatus may be embodied by any of a variety of different components and, in one embodiment, is embodied by virtual network controlling infrastructure in a 5G communication system. As shown in FIG. 2, the apparatus of an example embodiment includes, is associated with or is otherwise in communication with a processor 22, an associated memory 24 and a communication interface 26.

The processor 22 (and/or co-processors or any other circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure of the processor to perform the algorithms and/or operations described herein when the instructions are executed. However, in some cases, the processor may be a processor of a specific device configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The communication interface 26 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3:
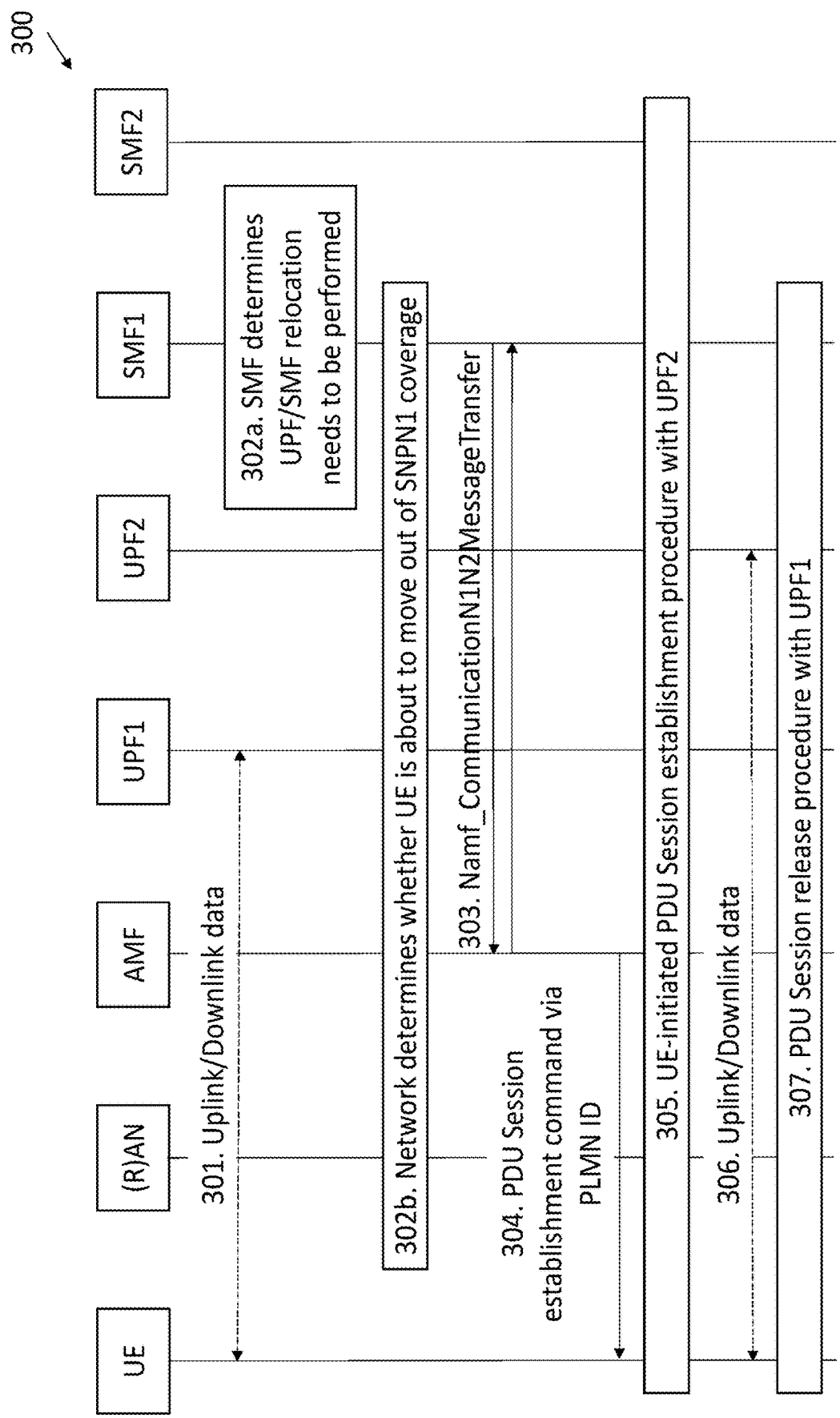
FIG. 3 illustrates operations performed, such as by the apparatus of FIG. 2.
Figure 4:
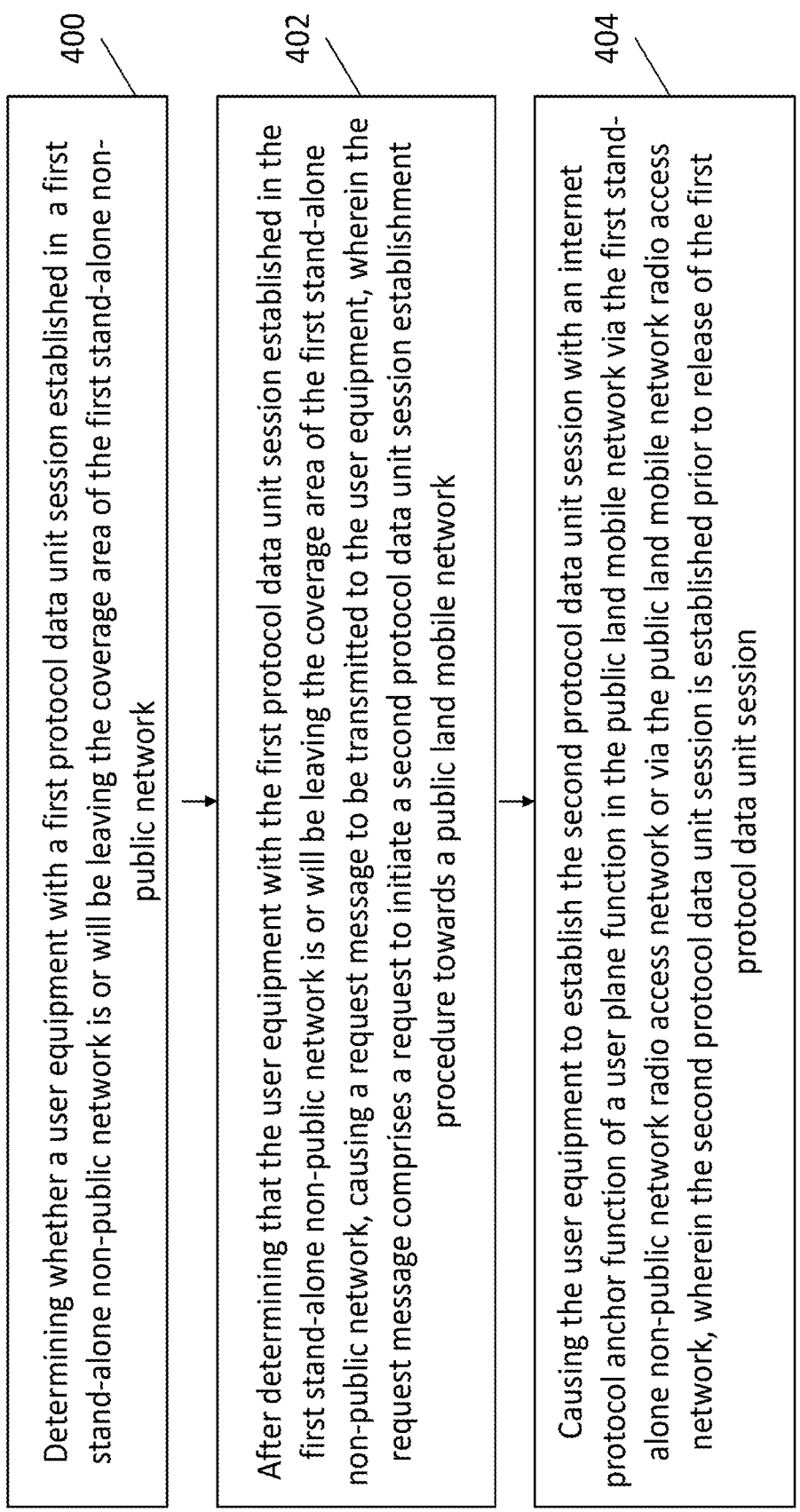
FIG. 4 illustrates operations performed, such as by the apparatus of FIG. 2.

The operations performed by the apparatus 20 are depicted in a flowchart of FIG. 3 and FIG. 4.

As shown by block 301, the apparatus includes means, such as the processor 22, the communication interface 26 or the like, for providing uplink/downlink data associated with a first SNPN to one or more allowed user equipment in a coverage area via a SNPN radio access network in the coverage area.

Block 302A corresponds to the apparatus including means, such as the processor 22, the communication interface 26 or the like, for determining that UPF/SMF relocation needs to be performed.

While the first PDU Session remains established, the apparatus including means, such as the processor 22, the communication interface 26 or the like, for requesting the UE to establish another PDU session via the PLMN operator network which provides a PLMN ID for a target network. Alternatively, the apparatus including means, such as the processor 22, the communication interface 26 or the like, for requesting to release the PDU Session established with SNPN and request the UE to establish another PDU Session via the PLMN operator network. This alternative, however, is a fall-back approach because of a slight service disruption that may occur.

In an example embodiment, the apparatus including means, such as the processor 22, the communication interface 26 or the like, for determining that the UE is at the edge of the SNPN coverage area by measuring the radio signal strength, which can be done periodically. The UE is able to communicate information as to the quality of radio conditions and whether or not the UE is at the edge of the SNPN1. In an example embodiment, the AMF can use the radio signal measurements reported to determine if the UE is in the edge of the network. When the UE is in the edge of the network and may be about to move out of SNPN coverage, AMF reports it to the SMF. The SMF uses the information reported by AMF and determines if the UE may be moving out of the UPF serving area.

As shown in block 302b, the apparatus includes means, such as the processor 22, the communication interface 26 or the like, for determining whether the UE is about to lose SNPN 1 coverage.

In response to determining that the UE is about to lose SNPN1 coverage, the apparatus includes means, such as the processor 22, the communication interface 26 or the like, for providing network function (NF) services such as a Namf_CommunicationN1N2MessageTransfer to be sent between the AMF and the SMF1 (see block 303), the Namf_CommunicationN1N2MessageTransfer enables an NF consumer to communicate with the UE and/or the access network through the AMF. This service enables SMF to request EBI allocation to support interworking with EPS. This service also supports PWS functionality as described in TS 23.041.

In block 304, the apparatus includes means, such as the processor 22, the communication interface 26 or the like, for causing the UE to initiate a PDU session establishment command via the PLMN ID.

Based on the results of 304, the UE initiates a PDU session establishment procedure with UPF2 as depicted in block 305.

Accordingly, uplink/downlink is transmitted between the UE and UPF2 as depicted in block 306.

In block 307, the PDU session and IP@1 may remain active until a PDU release procedure with UPF1 is initiated.

Under the above operating environment, the present application provides the session shown in FIG. 3. FIG. 4 is a flowchart of an embodiment of the session implementation of a method. In block 400 of FIG. 4, the apparatus includes means, such as the processor 22, the communication interface 26 or the like, for determining whether a user equipment with a first protocol data unit session established in a first stand-alone non-public network is or will be leaving the coverage area of the first stand-alone non-public network In an example embodiment, the apparatus includes means, such as the processor 22, the communication interface 26 or the like, for comparing a measured radio signal at the user equipment with a threshold radio signal and determining that the user equipment is moving out of the coverage area of the first stand-alone non-public network based on the comparison.

In block 402, the apparatus includes means, such as the processor 22, the communication interface 26 or the like, for after determining that the user equipment with the first protocol data unit session established in the first stand-alone non-public network is or will be leaving the coverage area of the first stand-alone non-public network, causing a request message to be transmitted to the user equipment, wherein the request message comprises a request to initiate a second protocol data unit session establishment procedure towards a public land mobile network.

In an example embodiment, the request message carries a session identifier of the first PDU session, the session identifier of the session for the first PDU uniquely identifies the first PDU session.

In another example embodiment, the request message comprising the request to initiate the second protocol data unit session establishment procedure towards the public land mobile network further comprises a public land mobile network identification for the public land mobile network.

In block 404, the apparatus includes means, such as the processor 22, the communication interface 26 or the like, for causing the user equipment to establish the second protocol data unit session with an internet protocol anchor function of a user plane function in the public land mobile network via the first stand-alone non-public network radio access network or via the public land mobile network radio access network, wherein the second protocol data unit session is established prior to release of the first protocol data unit session. Accordingly, the UE has PDU session with anchor point UPF in the PLMN via PLMN RAN. Additionally, the UE may set the request type to existing PDU session in order to ensure that the PDU session is moved, and not established new.

Additionally or alternatively, the apparatus includes means, such as the processor 22, the communication interface 26 or the like, for causing to release the first protocol data unit session established in the first stand-alone non-public network prior to causing the user equipment to establish the second protocol data unit session with the internet protocol anchor function of the user plane function in the public land mobile network.

For example, the apparatus includes means, such as the processor 22, the communication interface 26 or the like, for providing full service continuity while not making any assumption regarding the agreement between SNPN and PLMN networks. In the example embodiment, the apparatus includes means, such as the processor 22, the communication interface 26 or the like, for leveraging Session and Service Continuity (SSC) mode 3 'make-before-break' principles by guiding the UE to establish a second PDU Session in the PLMN prior to releasing the first PDU Session established in the SNPN in order to ensure service continuity or in another embodiment, guiding the UE to establish a second PDU Session in the SNPN prior to releasing the first PDU Session established in the PLMN.

Figure 5:
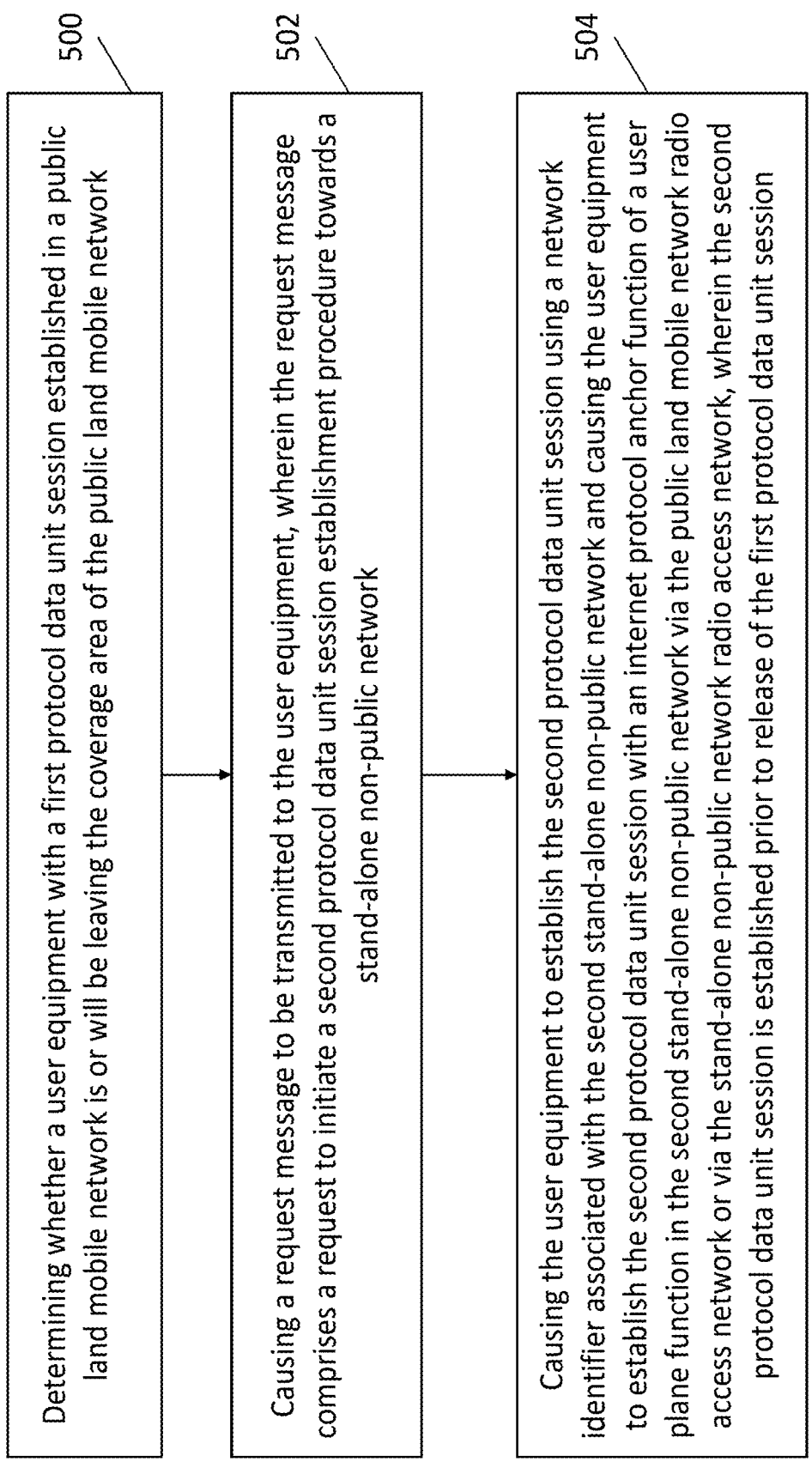
FIG. 5 illustrates further operations performed, such as by the apparatus of FIG. 2.

Additionally or alternatively, the apparatus includes means, such as the processor 22, the communication interface 26 or the like, for detecting that the user equipment will be leaving the coverage area of the public land mobile network as shown in FIG. 5.

In block 500, the apparatus includes means, such as the processor 22, the communication interface 26 or the like, for determining whether a user equipment with a first protocol data unit session established in a public land mobile network is or will be leaving the coverage area of the public land mobile network.

In block 502, the apparatus includes means, such as the processor 22, the communication interface 26 or the like, for causing a request message to be transmitted to the user equipment, wherein the request message comprises a request to initiate a second protocol data unit session establishment procedure towards a stand-alone non-public network.

The apparatus includes means, such as the processor 22, the communication interface 26 or the like, for causing the user equipment to establish the second protocol data unit session using a network identifier associated with the second stand-alone non-public network and causing the user equipment to establish the second protocol data unit session with an internet protocol anchor function of a user plane function in the second stand-alone non-public network via the public land mobile network radio access network or via the stand-alone non-public network radio access network, wherein the second protocol data unit session is established prior to release of the first protocol data unit session as shown in block 504 of FIG. 5.

In another example embodiment, the apparatus includes means, such as the processor 22, the communication interface 26 or the like, for causing release of the first protocol data unit session established in the public land mobile network in response to the first protocol data unit session established in the public land mobile network being inactive for at least a threshold inactivity period.

The request message comprising the request to initiate the second protocol data unit session establishment procedure towards the stand-alone non-public network further comprises a network identifier for the stand-alone non-public network.

In yet another example embodiment, the apparatus includes means, such as the processor 22, the communication interface 26 or the like, for causing to release the first protocol data unit session established in the public land mobile network prior to causing the user equipment to establish the second protocol data unit session with the internet protocol anchor function of the user plane function in the stand-alone non-public network.

Thus, if the network has signalled to the UE to establish a new PDU session, the UE establishes PDU session with anchor point in the SNPN UPF via SNPN RAN. Alternatively, if the network has not signalled to the to the UE to establish a new PDU session, the UE still has PDU session with anchor point in the PLMN UPF. For example, in circumstances in which the network has not signalled to the user equipment to establish a new PDU session, the user equipment still has its former established PDU session using the internet protocol anchor function of the user plane function in the PLMN.

Additionally or alternatively, the user equipment is configured to store guidance information used to further indicate that the user equipment is leaving the coverage area of the first stand-alone non-public network. In an example embodiment the guidance information identifies cells that are at an edge of the first stand-alone non-public network.

In an example embodiment, the apparatus includes means, such as the processor 22, the communication interface 26 or the like, for causing the guidance information to be transmitted to the user equipment, wherein after determining that the user equipment accesses the cells that are at the edge of the first stand-alone non-public network, causing the user equipment to initiate the second protocol data unit session establishment procedure towards the public land mobile network.

Thereafter and wherein after determining that the user equipment no longer access the cells that are at the edge of the first stand-alone non-public network, the apparatus includes means, such as the processor 22, the communication interface 26 or the like, for causing the user equipment to initiate a release of the second protocol data unit session established towards the public land mobile network.

In an example embodiment, the user equipment uses the guidance information in determining to initiate the establishment or release of the PDU session.

Once the second PDU session is established according to the an example embodiment identified above, the apparatus includes means, such as the processor 22, the communication interface 26 or the like, for causing release of the first protocol data unit session established in the first stand-alone non-public network in response to the first protocol data unit session established in the first stand-alone non-public network being inactive for at least a threshold inactivity period. The threshold inactivity period may be stored in the continuity selection policy and/or may be provided to the user equipment by the network when the protocol data unit session is established.

Figure 6:
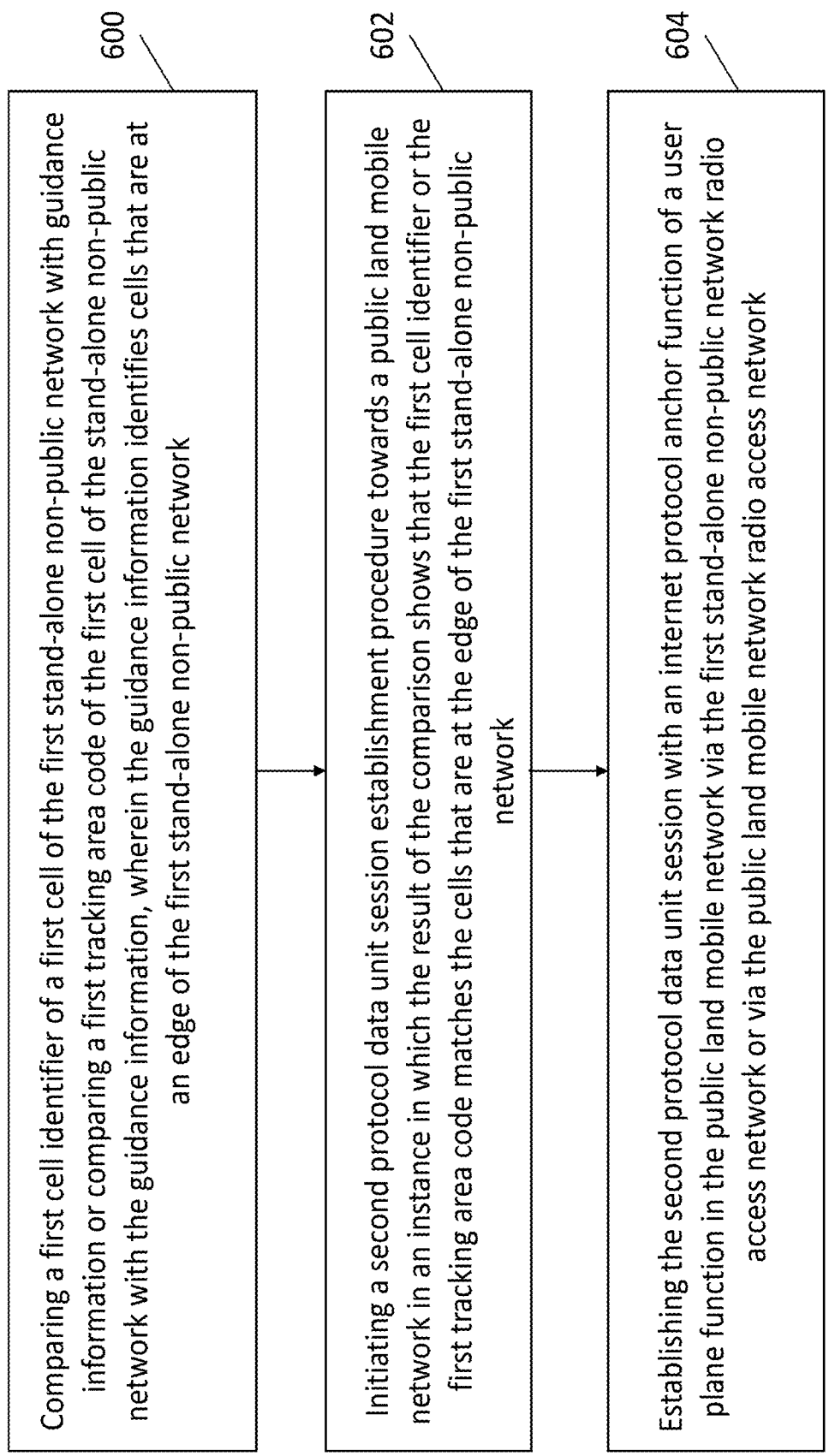
FIG. 6 illustrates yet another set of operations performed, such as by the apparatus of FIG. 2.

FIG. 6 is an example flowchart performed in accordance with some example embodiments of the present invention. As shown in operation 600, the apparatus that is embodied, for example, by the UE may include means, such as the processor 22, the communication interface 26 or the like for comparing a first cell identifier of a first cell of a first stand-alone non-public network with guidance information or comparing a first tracking area code of the first cell of the stand-alone non-public network with the guidance information, wherein the guidance information identifies cells that are at an edge of the first stand-alone non-public network.

As shown in operation 602, the apparatus that is embodied, for example, by the UE may include means, such as the processor 22, the communication interface 26 or the like for initiating a second protocol data unit session establishment procedure towards a public land mobile network in an instance in which the result of the comparison shows that the first cell identifier or the first tracking area code matches the cells that are at the edge of the first stand-alone non-public network. Additionally or alternatively, the UE may initiate a release of the second protocol data unit session established towards the public land mobile network in an instance in which the result of the comparison shows that the first cell identifier or the first tracking area code does not match the cells that are at the edge of the first stand-alone non-public network.

As shown in operation 604, the apparatus that is embodied, for example, by the UE may include means, such as the processor 22, the communication interface 26 or the like for establishing the second protocol data unit session with an internet protocol anchor function of a user plane function in the public land mobile network via the first stand-alone non-public network radio access network or via the public land mobile network radio access network.

Figure 7:
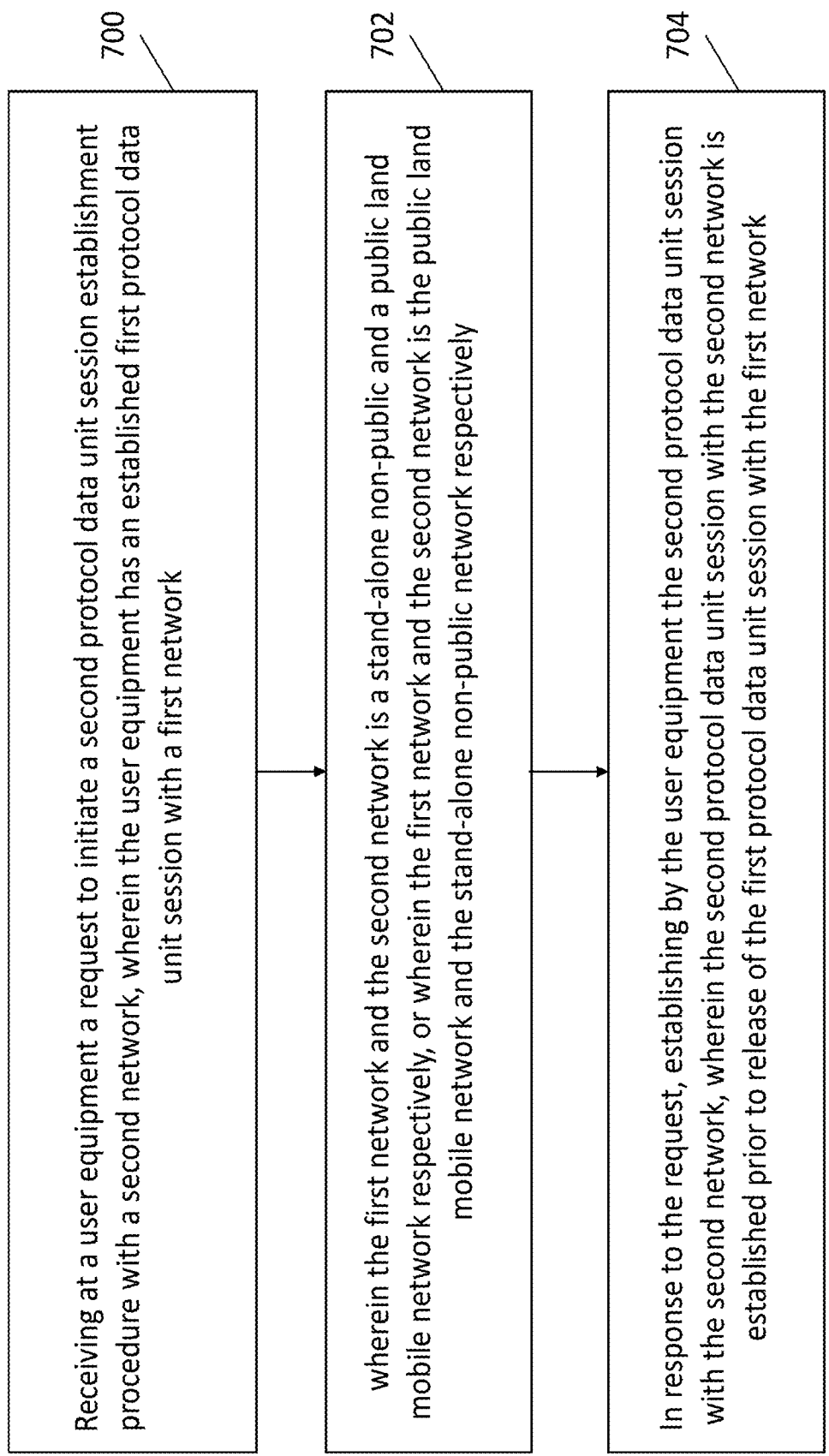
FIG. 7 illustrates operations performed, such as by the apparatus of FIG. 2.

In another example embodiment as depicted in FIG. 7, the apparatus that is embodied, for example, by the UE may include means, such as the processor 22, the communication interface 26 or the like for receiving at a user equipment a request to initiate a second protocol data unit session establishment procedure with a second network, wherein the user equipment has an established first protocol data unit session with a first network as shown in operation 700. In operation 702, the first network and the second network is a stand-alone non-public and a public land mobile network respectively, or the first network and the second network is the public land mobile network and the stand-alone non-public network respectively.

The apparatus that is embodied, for example, by the UE may include means, such as the processor 22, the communication interface 26 or the like for, in response to the request, establishing by the user equipment the second protocol data unit session with the second network, wherein the second protocol data unit session with the second network is established prior to release of the first protocol data unit session with the first network as shown in operation 704.

As described above, FIGS. 3, 4, 5, 6, and 7 include flowcharts of an apparatus 20, method, and computer program product according to certain example embodiments. It will be understood that each block of the flowcharts, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
causing guidance information to be transmitted to user equipment, wherein the guidance information identifies cells that are at an edge of a first stand-alone non-public network;
based on comparing, by a user equipment, guidance information with a first tracking area code of a first cell of the first stand-alone non-public network or with a first cell identifier of the first cell of the first stand-alone non-public network, determining the user equipment with a first protocol data unit session established in the first stand-alone non-public network will be leaving a coverage area of the first stand-alone non-public network;
after determining that the user equipment with the first protocol data unit session established in the first stand-alone non-public network will be leaving the coverage area of the first stand-alone non-public network, determining that the user equipment accesses cells that are at an edge of the first stand-alone non-public network;
based on determining that the user equipment accesses the cells that are at an edge of the first stand-alone non-public network, causing a request message to be transmitted to the user equipment, wherein the request message comprises a request to initiate a second protocol data unit session establishment procedure towards a public land mobile network;
causing the user equipment to establish the second protocol data unit session with an internet protocol anchor function of a user plane function in the public land mobile network via the first stand-alone non-public network radio access network or via the public land mobile network radio access network, wherein the second protocol data unit session is established prior to release of the first protocol data unit session;
causing release of the first protocol data unit session established in the first stand-alone non-public network in response to the first protocol data unit session established in the first stand-alone non-public network being inactive for at least a threshold inactivity period;
transmitting a signal to the user equipment to establish a third protocol unit session via a second stand-alone non-public network identified by a certain network identifier (NID);
causing the user equipment to establish a third protocol data unit session with an internet protocol anchor function of a second user plane function in a second stand-alone non-public network via the public land mobile network radio access network or via second stand-alone non-public network radio access network, wherein the third protocol data unit session is established prior to release of the second protocol data unit session; and
after determining that the user equipment no longer access the cells that are at the edge of the public land mobile network, causing the user equipment to initiate a release of the second protocol data unit session established towards the public land mobile network.

2. The method according to claim 1, wherein determining the user equipment with the first protocol data unit session established in the first stand-alone non-public network will be leaving the coverage area of the first stand-alone non-public network comprises: comparing a measured radio signal at the user equipment with a threshold radio signal; and determining that the user equipment is moving out of the coverage area of the first stand-alone non-public network based on the comparison.

3. The method according to claim 1, wherein the user equipment is configured to store guidance information used to further indicate that the user equipment is leaving the coverage area of the first stand-alone non-public network.

4. The method according to claim 3, wherein the guidance information further identifies cells that are at an edge of the public land mobile network.

5. The method according to claim 1, wherein the user equipment is a mobile device.

6. The method according to claim 1, wherein the request message comprising the request to initiate the second protocol data unit session establishment procedure towards the public land mobile network further comprises a public land mobile network identification for the public land mobile network.

7. The method according to claim 1, wherein the first protocol data unit session uses a first communication path having first internet protocol (IP) address, and wherein the second protocol data unit session uses a second communication path having a second IP address different than the first IP address.

8. An apparatus comprising:
 at least one processor; and
 at least one memory including computer program code, the at least one memory and the computer program code configured to, with the at least one processor, cause the apparatus to at least:
  cause guidance information to be transmitted to user equipment, wherein the guidance information identifies cells that are at an edge of the first stand-alone non-public network;
  based on comparing, by the user equipment, guidance information with a first tracking area code of a first cell of a first stand-alone non-public network or with a first cell identifier of the first cell of the first stand-alone non-public network, determine the user equipment with a first protocol data unit session established in the first stand-alone non-public network will be leaving a coverage area of the first stand-alone non-public network;
  after determining that the user equipment with the first protocol data unit session established in the first stand-alone non-public network is or will be leaving the coverage area of the first stand-alone non-public network, determine that the user equipment accesses cells that are at an edge of the first stand-alone non-public network;
  based on determining that the user equipment accesses the cells that are at an edge of the first stand-alone non-public network, cause a request message to be transmitted to the user equipment, wherein the request message comprises a request to initiate a second protocol data unit session establishment procedure towards a public land mobile network;
  cause the user equipment to establish the second protocol data unit session with an internet protocol anchor function of a user plane function in the public land mobile network via the first stand-alone non-public network radio access network or via the public land mobile network radio access network, wherein the second protocol data unit session is established prior to release of the first protocol data unit session;
  cause a release of the first protocol data unit session established in the first stand-alone non-public network in response to the first protocol data unit session established in the first stand-alone non-public network being inactive for at least a threshold inactivity period;
  transmit a signal to the user equipment to establish a third protocol unit session via a second stand-alone non-public network identified by a certain network identifier (NID);
  cause the user equipment to establish the third protocol data unit session with an internet protocol anchor function of a second user plane function in a second stand-alone non-public network via the public land mobile network radio access network or via second stand-alone non-public network radio access network, wherein the third protocol data unit session is established prior to release of the second protocol data unit session; and
  after determining that the user equipment no longer access the cells that are at the edge of the public land mobile network, cause the user equipment to initiate a release of the second protocol data unit session established towards the public land mobile network.

9. The apparatus according to claim 8, wherein determining the user equipment with the first protocol data unit session established in the first stand-alone non-public network will be leaving the coverage area of the first stand-alone non-public network further causes the apparatus to at least: compare a measured radio signal at the user equipment with a threshold radio signal; and determine that the user equipment is moving out of the coverage area of the first stand-alone non-public network based on the comparison.

10. The apparatus according to claim 8, wherein the user equipment is configured to store guidance information used to further indicate that the user equipment is leaving the coverage area of the first stand-alone non-public network.

11. The apparatus according to claim 10, wherein the first protocol data unit session uses a first communication path having first internet protocol (IP) address, and wherein the second protocol data unit session uses a second communication path having a second IP address different than the first IP address.

12. The apparatus according to claim 8, wherein the user equipment is a mobile computing device.

13. A system comprising:
 a user equipment;
 at least one processor; and
 at least one memory comprising computer-executable instructions that, when executed by the at least one processor, cause the at least one processor to perform the following operations:
  cause guidance information to be transmitted to user equipment, wherein the guidance information identifies cells that are at an edge of the first stand-alone non-public network;
  based on comparing, by the user equipment, guidance information with a first tracking area code of a first cell of a first stand-alone non-public network or with a first cell identifier of the first cell of the first stand-alone non-public network, determine the user equipment with a first protocol data unit session established in the first stand-alone non-public network will be leaving a coverage area of the first stand-alone non-public network;

after determining that the user equipment with the first protocol data unit session established in the first stand-alone non-public network is or will be leaving the coverage area of the first stand-alone non-public network, determine that the user equipment accesses cells that are at an edge of the first stand-alone non-public network;

based on determining that the user equipment accesses the cells that are at an edge of the first stand-alone non-public network, cause a request message to be transmitted to the user equipment, wherein the request message comprises a request to initiate a second protocol data unit session establishment procedure towards a public land mobile network;

cause the user equipment to establish the second protocol data unit session with an internet protocol anchor function of a user plane function in the public land mobile network via the first stand-alone non-public network radio access network or via the public land mobile network radio access network, wherein the second protocol data unit session is established prior to release of the first protocol data unit session;

cause a release of the first protocol data unit session established in the first stand-alone non-public network in response to the first protocol data unit session established in the first stand-alone non-public network being inactive for at least a threshold inactivity period;

transmit a signal to the user equipment to establish a third protocol unit session via a second stand-alone non-public network identified by a certain network identifier (NID);

cause the user equipment to establish the third protocol data unit session with an internet protocol anchor function of a second user plane function in a second stand-alone non-public network via the public land mobile network radio access network or via second stand-alone non-public network radio access network, wherein the third protocol data unit session is established prior to release of the second protocol data unit session; and after determining that the user equipment no longer access the cells that are at the edge of the public land mobile network, cause the user equipment to initiate a release of the second protocol data unit session established towards the public land mobile network.

14. The system according to claim 13, wherein determining whether the user equipment with the first protocol data unit session established in the first stand-alone non-public network will be leaving the coverage area of the first stand-alone non-public network comprises: comparing a measured radio signal at the user equipment with a threshold radio signal; and determining that the user equipment is moving out of the coverage area of the first stand-alone non-public network based on the comparison.

15. The system according to claim 13, wherein the user equipment is configured to store guidance information used to further indicate that the user equipment is leaving the coverage area of the first stand-alone non-public network.

16. The system according to claim 15, wherein the guidance information further identifies cells that are at an edge of the public land mobile network.

17. The system according to claim 13, wherein the user equipment is a mobile device.

18. The system according to claim 13, wherein the request message comprising the request to initiate the second protocol data unit session establishment procedure towards the public land mobile network further comprises a public land mobile network identification for the public land mobile network.

19. The system according to claim 13, wherein the first protocol data unit session uses a first communication path having first internet protocol (IP) address, and wherein the second protocol data unit session uses a second communication path having a second IP address different than the first IP address.

20. The system according to claim 13, wherein the first protocol data unit session uses a first communication path having first internet protocol (IP) address, wherein the second protocol data unit session uses a second communication path having a second IP address different than the first IP address, and wherein the third protocol data unit session uses a third communication path having a third IP address different that the first IP address and the second IP address.

* * * * *